(12) United States Patent
Wallis

(10) Patent No.: US 9,979,418 B2
(45) Date of Patent: May 22, 2018

(54) METHOD AND DEVICE FOR TRANSMITTING INFORMATION OVER A COMMUNICATION CHANNEL WITH VARIABLE IMPEDANCE

(71) Applicant: STMicroelectronics (Rousset) SAS, Rousset (FR)

(72) Inventor: Mark Wallis, Mouans Sartoux (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days. days.

(21) Appl. No.: 15/617,831

(22) Filed: Jun. 8, 2017

(65) Prior Publication Data

US 2017/0272105 A1   Sep. 21, 2017

Related U.S. Application Data

(63) Continuation of application No. 14/961,985, filed on Dec. 8, 2015, now Pat. No. 9,705,533.

(30) Foreign Application Priority Data

Jun. 4, 2015   (FR) ..................................... 15 55084

(51) Int. Cl.
*H04B 1/00* (2006.01)
*H04B 3/54* (2006.01)
*H04L 5/00* (2006.01)

(52) U.S. Cl.
CPC ............. *H04B 1/0007* (2013.01); *H04B 3/54* (2013.01); *H04L 5/001* (2013.01); *H04B 2203/5425* (2013.01)

(58) Field of Classification Search
CPC .... H04B 2203/5425; H04B 3/54; H04L 5/001
See application file for complete search history.

(56) References Cited

U.S. PATENT DOCUMENTS

| | | |
|---|---|---|
| 2001/0045843 A1 | 11/2001 | Hernandez-Marti |
| 2004/0247038 A1 | 12/2004 | Uesugi et al. |
| 2008/0043992 A1 | 2/2008 | Hurwitz |
| 2011/0149773 A1 | 6/2011 | Lee et al. |
| 2014/0307812 A1* | 10/2014 | Chen ....................... H04B 3/54 375/258 |

* cited by examiner

*Primary Examiner* — Ross Varndell
(74) *Attorney, Agent, or Firm* — Slater Matsil, LLP

(57) ABSTRACT

A method includes digital/analog conversion of a digital signal modulated by information to provide a modulated initial analog signal having a crest factor greater than one, and amplification of the initial analog signal to provide an amplified modulated signal. A modulated channel analog signal derived from the modulated amplified analog signal is transmitted over a communications channel, with impedance of the communications channel varying during the transmission. The method further includes at least one determination during the transmission of a peak-clipping rate of the amplified analog signal over at least one time interval, and an adjustment of a level of the initial analog signal as a function of the determined peak-clipping rate.

20 Claims, 6 Drawing Sheets

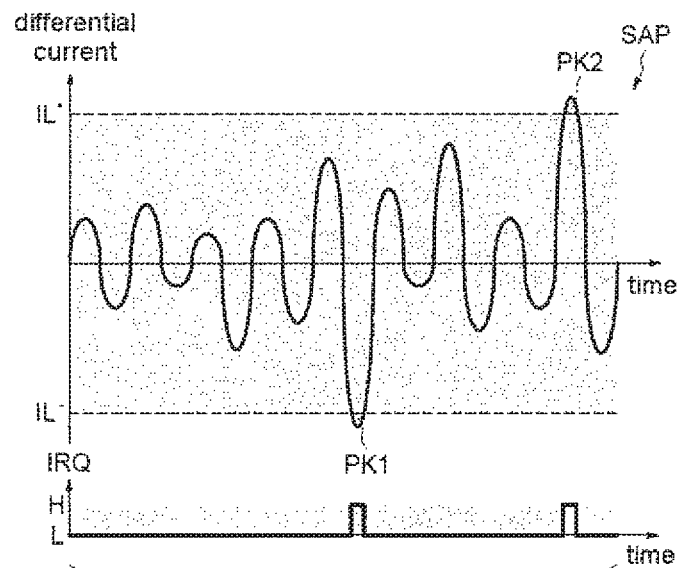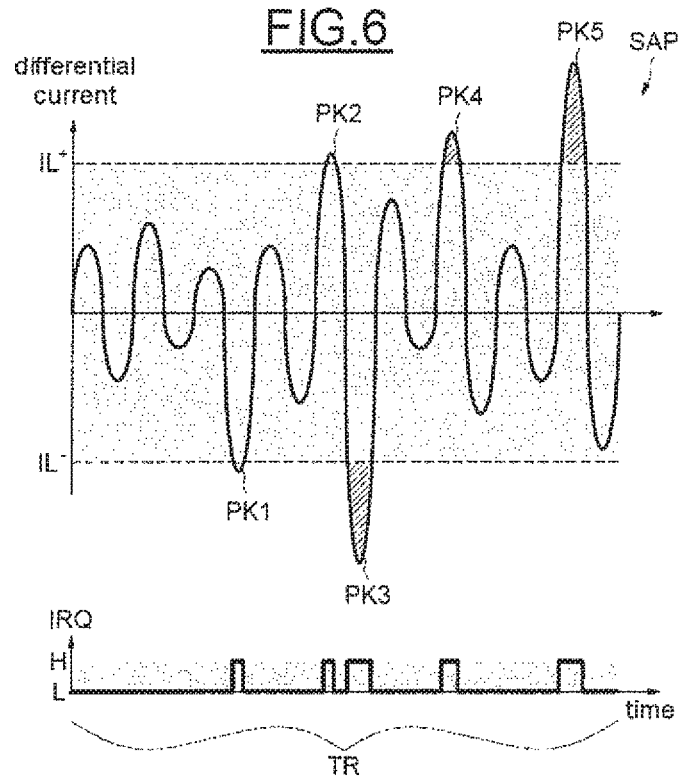

METHOD AND DEVICE FOR TRANSMITTING INFORMATION OVER A COMMUNICATION CHANNEL WITH VARIABLE IMPEDANCE

CROSS-REFERENCE TO RELATED APPLICATIONS

This application is a continuation of U.S. patent application Ser. No. 14/961,985, filed on Dec. 8, 2015, which claims priority to France Application No. 1555084, filed on Jun. 4, 2015, all of which are hereby incorporated herein by reference.

TECHNICAL FIELD

Implementations and embodiments of the invention relate to transmission of information over a communications channel, and in particular, when the communications channel is an electrical line and the transmission of information is based on power line communications (PLC). More particularly, processing of such a signal in transmission mode is improved when an impedance of the transmission channel seen by the transmitter drops.

Implementations and embodiments are compatible with the different standards governing power line communications, in particular, but not exclusively, PLC-G3, PRIME (PoweRline Intelligent Metering Evolution) standards or even the IEEE 1901-2 standard.

BACKGROUND

An aim of power line communications technology is to transmit digital data by exploiting the existing infrastructure of the electrical network. In particular, it is possible to remotely read electrical meters, allow for exchanges between electric vehicles and recharging terminals, or even allows for management and control of energy networks (smart grid).

Power line communications (PLC) technology notably incorporates narrowband power line communications (N-PLC) which is generally defined as a communications over an electrical line operating at transmission frequencies up to 500 KHz. The N-PLC communications thus generally uses frequency bands notably defined by the European Committee for Electrotechnical Standardization (CENELEC) or by the Federal Communications Commission (FCC).

Thus, to consider the CENELEC A frequency band (3-95 kHz), the transmission frequencies are situated between 42 and 89 KHz in the PRIME standard, whereas they are situated between 35 and 91 KHz for the PLC-G3 standard.

The signals used in PLC communications are signals modulated according to a multicarrier modulation, for example, a quadrature modulation on orthogonal carriers (Orthogonal Frequency Division Multiplexing modulation, or OFDM modulation), but using only a subset of carriers out of a larger set of available carriers.

Thus, for example, to consider the CENELEC A frequency band, the size of the inverse Fourier transform and of the direct Fourier transform is equal to 512, whereas only 97 sub-carriers (the sub-carriers 86 to 182) are used for the transmission in the PRIME standard.

To consider the CENELEC A frequency band, the size of the inverse Fourier transform and of the direct Fourier transform is equal to 256 while only 36 sub-carriers (the sub-carriers 23 to 58) are used in the PLC-G3 standard.

The signals used in PLC communications and modulated according to OFDM modulation exhibit a crest factor greater than one and generally higher. The crest factor of a signal, commonly called PAPR (Peak-to-Average Power Ratio), is a characteristic measurement of this signal. It is the ratio between the absolute value of the maximum amplitude of the peaks of the signal and the effective signal value. It is equal to one for a constant signal, and greater than one as soon as the signal exhibits peaks.

In PLC communications, the impedance of the communications channel (the electrical line) seen by the transmitter can vary during communications and can drop when a user connects any device such as, for example, a hairdryer or a washing machine.

Typically, a resistive impedance of 2 Ohms seen by the transmitter serves as a reference for determining the maximum output power of the transmitter. Now, depending on the number of devices connected to the electrical line, this impedance seen by the transmitter may be less than 2 Ohms, or even lower.

Also, when the transmitter transmits a signal in a line having an impedance less than 2 Ohms, the power amplifier of the transmitter will enter into saturation in terms of current. The amplifier then enters into a current limiting mode in which it clips the current peaks exceeding the authorized maximum current. The result thereof is then a distortion of the signal and a generation of noise harmonics, or harmonic interferers.

Since the transmission frequencies of the signal are situated between 42 and 89 KHz in the PRIME standard and between 35 and 91 KHz for the PLC-G3 standard, the second harmonics are situated between 70 KHz and 180 KHz.

Consequently, some of these harmonics interfere with the upper part of the useful frequency band of the signal. Furthermore, these harmonics provoke interferences outside of the useful band of the signal which can disrupt other equipment.

Moreover, when the transmitter has to satisfy the requirements of the EN50065-1 standard, which is the case for transmissions according to the PRIME and PLC-G3 standards, the level of the output signal of the transmitter is measured with a peak detector over a pass band of 200 Hz and no part of the spectrum of the transmitted signal must exceed 120 dBµV.

SUMMARY

An object is to take into account a drop in impedance while limiting distortion of a transmitted signal to an acceptable level with respect to the intended application. There is a correlation between the peak-clipping rate of the signal and the distortion level which results therefrom, and the peak-clipping rate of the signal may be measured and the signal level may be adjusted as a function of the value of this peak-clipping rate.

According to one aspect, a method for transmitting information over a communications channel comprises a digital/analog conversion of a digital signal modulated by the information so as to obtain a modulated initial analog signal having a crest factor greater than one, an amplification of the initial analog signal so as to obtain an amplified modulated signal and a transmission over the communications channel of a modulated channel analog signal derived from the modulated amplified analog signal.

When the impedance of the communications channel is likely to vary during the transmission, the amplified signal may be clipped when the impedance is below a limit value, for example, 2 Ohms as seen by the transmitter. The method may then further comprise at least one determination during the transmission of a peak-clipping rate of the amplified signal over at least one time interval, and an adjustment of the level of the initial analog signal as a function of the determined peak-clipping rate.

Adjustment of the level of the initial analog signal may comprise a signal adjustment performed directly in analog mode on the initial analog signal or else indirectly on the initial analog signal by acting, for example, in digital mode directly or indirectly on the level of the modulated digital signal upstream of the digital/analog conversion.

Thus, by reducing the level of the signal at the input of the amplifier, it may be possible to reduce the peak-clipping rate and consequently the interferences caused by the distortion since the latter is also reduced. The peak-clipping rate is, for example, the number of peaks clipped of the signal during the time interval divided by the length of the time interval.

Adjustment of the level of the initial analog signal may comprise a comparison of the determined peak-clipping rate with a threshold and a lowering of the level of the initial analog signal if the peak-clipping rate is above the threshold. A person skilled in the art will be able to choose the value of this threshold as a function of the level of distortion acceptable in the application considered.

Reduction of the level of the signal reduces the signal-to-noise ratio. Consequently, the optimal operating conditions may be obtained when the level of interference due to the distortion is substantially equal to the noise. A person skilled in the art will be able to determine the value of the threshold to approximate, or even achieve, these optimal operating conditions. That said, as a non-limiting example, for transmissions according to the PRIME and PLC-G3 standards, a threshold equal to 0.1% of the total number of peaks of the time interval may be considered to lead to an acceptable level of distortion even in low noise conditions.

Generally, a number of successive determinations of the peak-clipping rate may advantageously be provided during successive time intervals, for example, when the information is transmitted during successive frames. In this case, during the current time interval, a determination may be made on adjustment of the level of the initial analog signal to be applied to the initial analog signal during the next time interval.

At the start of the transmission, the initial analog signal has a nominal level, and if, during a current time interval for which the level of the initial analog signal is below the nominal level, the determined peak-clipping rate is below the threshold, the adjustment of the level of the initial analog signal to be applied during the next time interval may comprise an increase in the level of the initial analog signal but without exceeding the nominal level.

When the information is transmitted by frame, each time interval may be, for example, the duration of a frame. The modulated signals may be modulated according to an OFDM modulation. In applications of the PLC type, the transmission channel may be an electrical line and the channel analog signal may be a signal conveyed by power line communications.

According to another aspect, a device for transmitting information comprises an input for receiving a digital signal modulated by the information, an output to be coupled to a communications channel to deliver a modulated channel analog signal, and processing means or a processor connected between the input and the output and configured to generate the modulated channel analog signal from the modulated digital signal.

The processor may comprise a digital/analog conversion stage configured to perform a digital/analog conversion of the modulated digital signal and deliver a modulated initial analog signal having a crest factor greater than one, and an amplifier stage configured to perform an amplification of the initial analog signal and deliver an amplified modulated signal.

Impedance of the communications channel may likely vary during the transmission, and the amplifier stage may be configured to clip the amplified signal when the impedance is below a limit value. The processor may further comprise a control module configured to perform at least one determination during the transmission of a peak-clipping rate of the amplified signal over at least one time interval and an adjustment of the level of the initial analog signal as a function of the determined peak-clipping rate.

As indicated above, adjustment of the level of the initial analog signal may be direct or indirect. Thus, the control module may be configured to directly adjust the level of the initial analog signal or else to adjust it indirectly by adjusting, for example, the level of the modulated digital signal.

The control module may comprise a comparator configured to perform a comparison of the determined peak-clipping rate with a threshold, and an adjustment means or adjustment circuitry configured to lower the level of the initial analog signal if the peak-clipping rate is above the threshold.

The control module may be configured to perform a number of successive determinations of the peak-clipping rate during successive time intervals, and to perform, during a current time interval, a determination of the adjustment of the level of the initial analog signal to be applied to the initial analog signal during the next time interval.

At the start of the transmission, the initial analog signal has a nominal level, and, if during a current time interval for which the level of the initial analog signal is below the nominal level, the determined peak-clipping rate is below the threshold, the adjustment circuitry may be configured to, during the next time interval, increase the level of the initial analog signal but without exceeding the nominal level.

The digital/analog conversion stage may be a variable gain stage and the adjustment circuitry may be configured to reduce or increase the gain so as to thus adjust the level of the initial analog signal.

According to yet another aspect, a transmitter comprises a device for transmitting information as defined above, and pre-processing means or a pre-processor configured to receive the information and to generate the digital signal modulated by the information.

BRIEF DESCRIPTION OF THE DRAWINGS

Other advantages and features of the invention will become apparent on examining the detailed description of implementations and embodiments that are in no way limiting, and the attached drawings in which:

FIGS. 1 to 9 schematically illustrate different implementations and embodiments of the invention.

DETAILED DESCRIPTION OF ILLUSTRATIVE EMBODIMENTS

The implementations and embodiments which will now be described in the context of transmission of information by power line communications (PLC), although they are not limited to this type of application.

Throughout the following, each time the PLC-G3 or PRIME standards are cited by way of non-limiting examples, it will be assumed that it is the CENELEC A frequency band (3-95 kHz) that is being considered.

Figure 1:
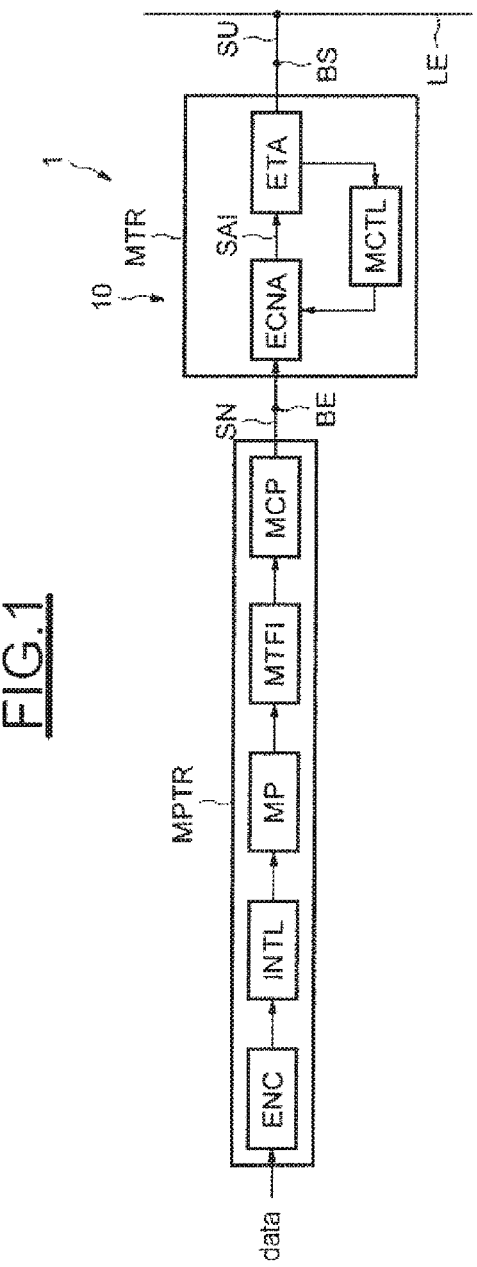

Reference is now made to FIG. 1 to schematically illustrate an exemplary transmitter 1 capable of transmitting a useful analog signal, or a channel analog signal SU over a communications channel by power line communications. The illustrated communications channel is an electrical line.

The transmission chain of the transmitter comprises preprocessing means or a pre-processor MPTR receiving the binary data, or information, to be transmitted from source coding means or a source coder, for example, and which are configured to generate a digital signal SN modulated by the information according to an OFDM modulation.

As a non-limiting example, the pre-processor MPTR as illustrated in FIG. 1 comprises an encoder ENC, for example, a convolution encoder. Interleaving means or an interleaver INTL is connected to the output of the encoder and is followed by mapping means or mapping circuitry which transforms the bits into symbols according to a transformation scheme dependent on the type of modulation used, for example, a BPSK type modulation, or more generally, a QAM modulation.

Each symbol contains modulation coefficients associated with carriers which will be modulated accordingly. The symbols are delivered as input for MTFI means or circuitry to perform an inverse fast Fourier transform (IFFT) operation.

Figure 2:
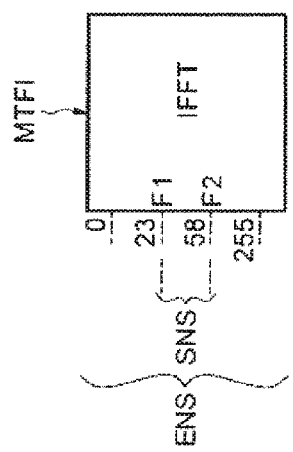

By referring more particularly to FIG. 2, the modulated carriers form a subset SNS of carriers out of an available set ENS of carriers (a set which corresponds to the size of the inverse Fourier transform).

Thus, in the PLC-G3 standard, the size of the inverse Fourier transform is equal to 256 whereas the modulated carriers of the subset SNS lie between the ranks 23 and 58. This corresponds to a frequency band F1-F2 lying between 35 and 91 KHz. The sampling frequency is equal to 400 KHz leading to a spacing between the carriers equal to 1.5625 KHz. This renders the frequencies orthogonal (OFDM modulation).

In the PRIME standard, the size of the inverse Fourier transform is equal to 512 while the number of carriers of the subset SNS is equal to 97. This provides, for the useful signal, a frequency band extending between 42 and 89 KHz. The modulation coefficients associated with the unused carriers are equal to zero.

The OFDM signal in the time domain is generated as an output from the MTFI circuitry, and MCP circuitry adds to each OFDM symbol in the time domain a cyclical prefix which is a copy at the head of the OFDM symbol of a certain number of samples situated at the end of this symbol.

Referring once again to FIG. 1, the digital signal SN, modulated by the information according to an OFDM modulation, and generated by the pre-processor MPTR, is delivered to the input BE of a device 10 for transmitting information over the electrical line LE. For this, the device 10 comprises a processor MTR connected to the output terminal BS coupled to the electrical line LE. The processor MTR will generate the channel analog signal SU from the digital signal SN.

More specifically, the modulated digital signal SN is converted in a digital/analog conversion stage ECNA, into an analog signal, here called an initial analog signal, SM, which is consequently also modulated.

The initial analog signal SAI is then processed in a stage ETA, commonly referred to by those skilled in the art an analog front end. The initial analog signal SAI undergoes a power amplification before being transmitted in the form of the modulated channel analog signal SU, over the electrical line LE.

In addition to the circuitry which has just been described, the processor MTR further comprises a control module MCTL configured to perform at least one determination, during the transmission of the information, of a peak-clipping rate of the amplified signal within the ETA stage, over at least one time interval, for example, a transmission frame. An adjustment of the level of the initial analog signal SAI is then performed as a function of the determined peak-clipping rate.

Figure 3:
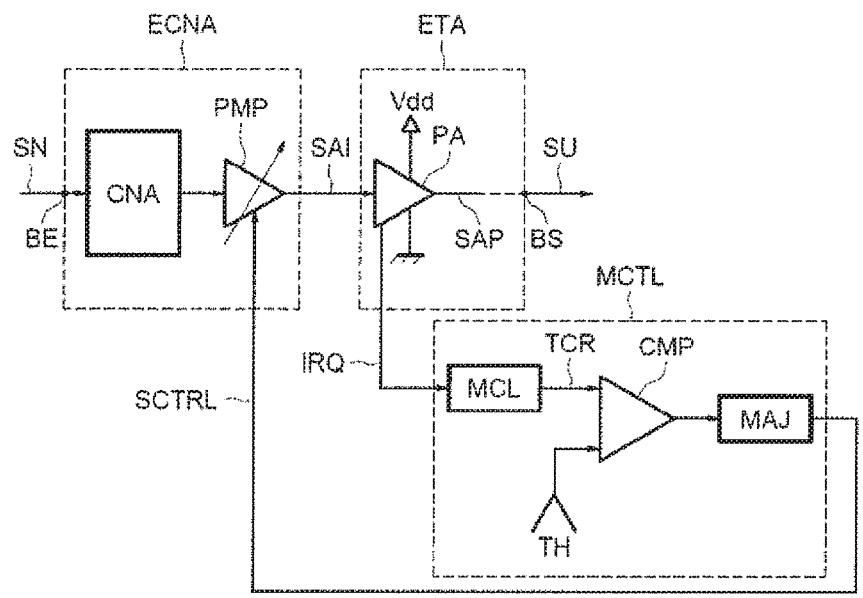

More specifically, as illustrated in more detail in FIG. 3, the digital/analog conversion stage ECNA comprises an actual digital/analog converter CNA followed by a variable gain amplifier PMP.

The stage ETA, for its part, notably comprises a power amplifier PA receiving the initial analog signal SAI and delivering an amplified analog signal SAP.

When the power amplifier PA enters into saturation, because of the drop in the impedance (seen by the transmitter) of the electrical line LE below a limit value, for example 2 Ohms, the amplified signal is clipped and an IRQ logic signal is transmitted. The IRQ logic signal remains, for example, in the high state as long as the power amplifier is in saturation and then drops back to the low state when the saturation state is finished. Thus, a pulse of the IRQ signal is representative of a clipped peak of the amplified signal SAP.

The control module MCTL comprises, for example, a computation means or circuitry MCL configured to determine the peak-clipping rate of the signal over a given time interval, for example, an information transmission frame, from the number of pulses of the IRQ signal over the time interval, for example.

The control module MCTL moreover comprises a comparator CMP configured to compare the duly computed peak-clipping rate TCR with a threshold TH. Based on the result of this comparison, an adjustment means or circuitry MAJ delivers a control signal SCTRL so as to adjust the level of the initial analog signal SAI, that is, to the signal at the input of the power amplifier PA. Typically, this level is lowered when the peak-clipping rate TCR is above the threshold TH.

The computation circuitry and/or the adjustment circuitry can be produced, for example, by logic circuits and/or by software within a microcontroller. In the example described here, the signal SCTRL acts on the variable gain amplifier PMP to modify its gain, for example, by decrementing or by incrementing the gain by a value ΔG expressed in dB.

As a variation, it would also be possible to perform the adjustment of the signal by acting, for example, on the level of the digital signal SN delivered to the digital/analog converter CNA.

Figure 4:
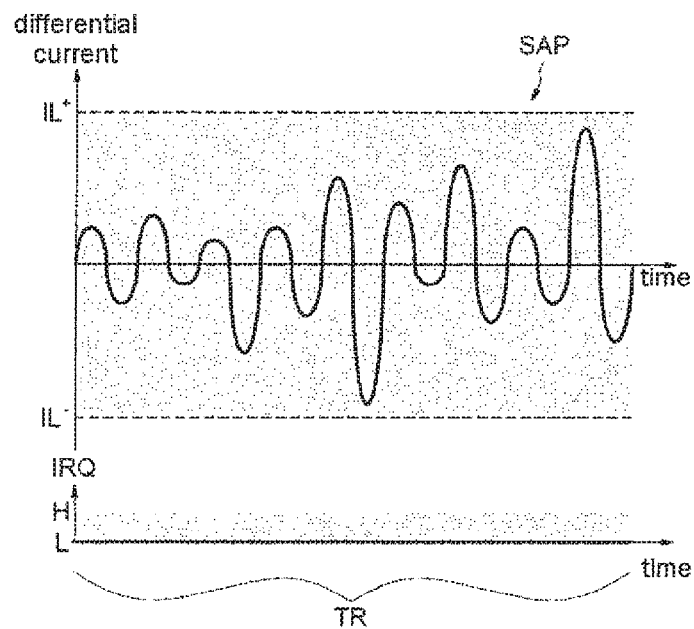

FIG. 4 illustrates, in the top part, an exemplary amplified modulated analog signal SAP delivered as output from the power amplifier PA, and more particularly in the present case, the change of the differential current delivered by this power amplifier during a transmission frame. This signal comprises peaks but none of these current peaks exceeds the limit values $IL^+$ and $IL^-$ beyond which the amplifier will enter into saturation.

Consequently, the IRQ signal, represented in the bottom part of Figure 4, remains constantly in its low state L. In this case, the peak-clipping rate of the signal SAP is zero and there is no distortion of the signal transmitted over the electrical line.

FIG. 5 schematically shows a configuration in which the amplified signal SAP comprises only a few clipped peaks. That is, peaks exhibiting an acceptable peak-clipping rate which leads to an acceptable distortion level. In this example, only two peaks PK1 and PK2 are clipped, which results in two pulses of the IRQ signal during the transmission frame TR.

The peak-clipping rate is then, for example, computed by counting the number of pulses of the IRQ signal and by dividing this number of pulses by the frame length. This peak-clipping rate can then be converted into a percentage of the total number of peaks of the signal SAP during the transmission frame TR.

Typically, for a PLC application, a peak-clipping rate TCR less than or equal a threshold of 0.1% is an acceptable rate. This rate leads to an acceptable distortion of the signal.

FIG. 6, on the other hand, shows a case of a signal SAP exhibiting a peak-clipping rate above the threshold. Thus, by way of example, the signal SAP here comprises five clipped peaks, which leads to five pulses of the IRQ signal during the frame.

Figure 7:
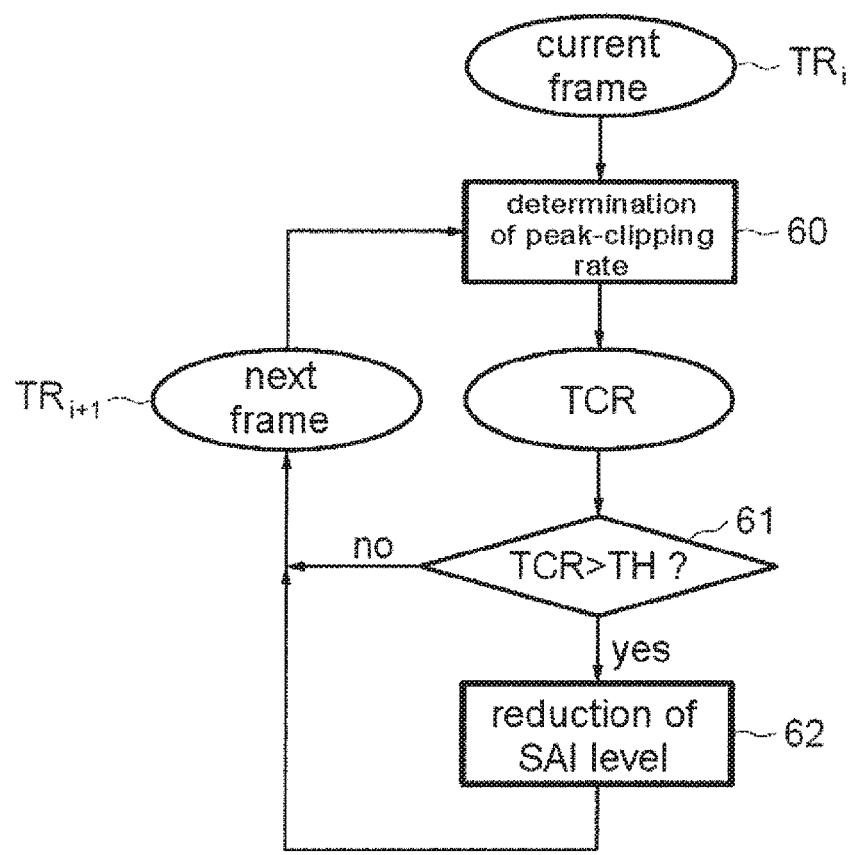
Figure 8:
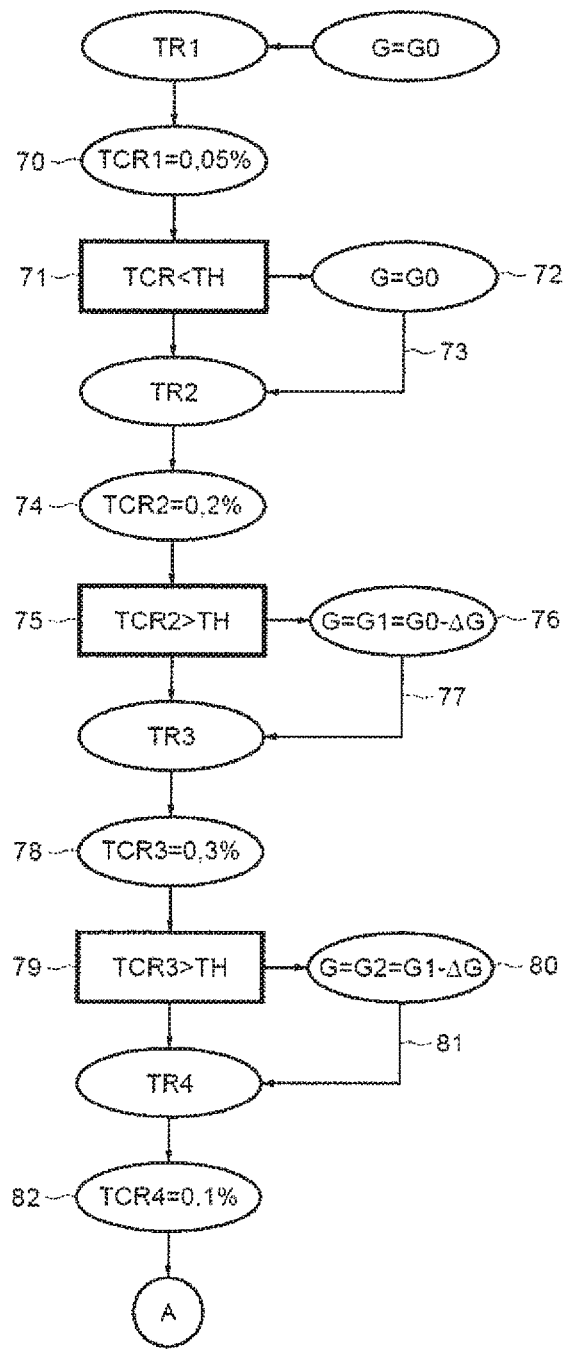
Figure 9:
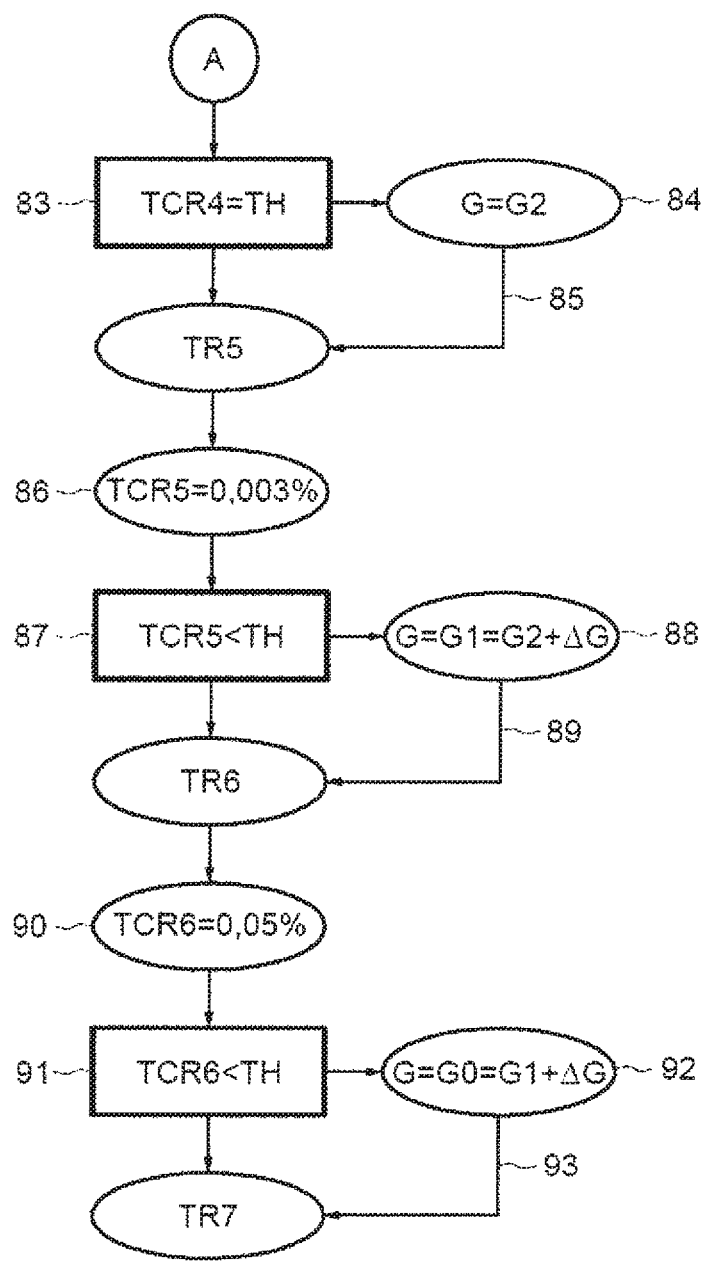

Reference is now made more particularly to FIGS. 7 to 9 to illustrate exemplary implementations of the method. In FIG. 7, it is assumed that the information is transmitted during successive frames, not necessarily evenly spaced in time.

During the current frame $TR_i$, the peak-clipping rate TCR is determined (step 60). This peak-clipping rate TCR is then compared to the threshold TH (step 61).

If the peak-clipping rate TCR is not above the threshold TH, then, in general, there is a transition to the next frame without reducing the level of the initial analog signal. However, as will be seen in more detail below, it is possible in certain cases that in presence of a peak-clipping rate TCR below the threshold TH, the level of the analog signal SAI is incremented for the next frame but without exceeding a nominal level.

If, however, the peak-clipping rate TCR is above the threshold TH, then the level of the signal SAI is reduced (step 62). This is typically done by lowering the gain G of the amplifier PMP. The reduced gain is then applied for the next frame $TR_{i+1}$.

Reference is now made more particularly to FIGS. 8 and 9 to illustrate an exemplary adjustment of the level of the analog signal SAI. It is assumed that the gain of G of the amplifier PMP has a nominal value G0 corresponding to an absence of peak-clipping or to a peak-clipping rate below the threshold. This threshold is chosen to be equal to 0.1% of the total number of peaks during a frame TR duration.

It is assumed that the gain G0 is applied during the first frame TR1. During this first frame, the peak-clipping rate TCR1 is determined (step 70) and is assumed equal to 0.05%. As this peak-clipping rate TCR1 is below the threshold TH (step 71), the adjustment circuitry MAJ does not modify the value of the gain G and keeps it at its nominal value G0 (step 72). This nominal value G0 will be applied during the next frame TR2.

During this next frame TR2, the peak-clipping rate TCR2 is once again determined (step 74) and it is assumed equal to 0.2%. Since this peak-clipping rate TCR2 is above the threshold TH (step 75), a new gain value G is computed, namely a value G1=G0−ΔG, where ΔG is the gain increment which will be subtracted from the nominal value G0 (step 76). This new gain G1 will be applied during the third frame TR3.

During this third frame TR3, the peak-clipping rate TCR3 is computed (step 78) and it is assumed equal to 0.3%. As this rate TCR3 is still above the threshold TH (step 79), a new gain value G2 will be determined by again subtracting the gain increment ΔG from the preceding gain G1 (step 80). This new gain G2 will be applied during the next frame TR4.

During this next frame TR4, the new peak-clipping rate TCR4 is determined (step 82) and this time it is equal to 0.1%. As this peak-clipping rate TCR4 corresponds to the threshold TH (step 83), the adjustment circuitry MAJ does not modify the value of the gain G and leaves it equal to the value G2 (step 84). This gain G2 will then be applied during the next frame TR5 (step 85).

During the frame TR5, the peak-clipping rate TCR is again determined (step 86) and this time it is equal to 0.003%. As the peak-clipping rate TCR5 is below the threshold TH (step 87), and the value of the gain is below its nominal value G0, a new gain G is determined in step 88 so as to be able to be applied for the next frame TR6.

This new gain is obtained by incrementing the preceding gain G2 by the gain increment ΔG, which then again provides the value G1 for the gain G. This value G1 is applied for the next frame TR6 (step 89).

During this next frame TR6, the peak-clipping rate TCR6 is computed and it is equal to 0.05% (step 90). As this peak-clipping rate TCR6 is below the threshold TH (step 91) and the value of the gain G1 is again below the nominal value G0, the adjustment circuitry MAJ will then confer on the gain G its nominal value G0 by incrementing the gain G1 by the gain increment ΔG (step 92).

The nominal gain G0 will then be applied to the next frame TR7 (step 93). The method then continues for the next frames.

In the above, it was assumed that the gain increment ΔG was constant. This increment ΔG can be computed as a function of the difference between the measured peak-clipping rate and the threshold TH, to speed up the response time to a significant change of impedance. In this case, ΔG can vary from one frame to another.

What is claimed is:

1. A method comprising:
amplifying an analog signal with a power amplifier to produce an amplified analog signal;
transmitting over a communication channel frames of information based on the amplified analog signal;
monitoring an output current of the power amplifier;
determining a current-peak clipping rate of the monitored output current;
comparing the current-peak clipping rate with a current-peak clipping rate threshold; and
modifying an amplitude of the analog signal based on comparing the current-peak clipping rate with the current-peak clipping rate threshold.

2. The method of claim 1, further comprising:
comparing the monitored output current of the power amplifier with a peak current threshold; and
generating a first signal based on comparing the monitored output current of the power amplifier with the peak current threshold, wherein the determining the current-peak clipping rate is based on the first signal.

3. The method of claim 2, wherein determining the current-peak clipping rate is based on a number of pulses of the first signal over a time interval.

4. The method of claim 3, wherein the time interval corresponds to duration of a frame of information of the frames of information.

5. The method of claim 2, wherein the first signal remains in a first state when the monitored output current is above the peak current threshold and remains in a second state different than the first state when the monitored output current is below the peak current threshold.

6. The method of claim 5, wherein the first state is a high state and the second state is a low state.

7. The method of claim 1, wherein modifying the amplitude of the analog signal comprises adjusting a gain of a variable gain amplifier generating the analog signal.

8. The method of claim 7, wherein adjusting the gain of the variable gain amplifier comprises modifying the gain of the variable gain amplifier by a gain step.

9. The method of claim 8, wherein adjusting the gain of the variable gain amplifier further comprises:
increasing the gain of the variable gain amplifier by the gain step when the current-peak clipping rate is below the current-peak clipping rate threshold; and
decreasing the gain of the variable gain amplifier by the gain step when the current-peak clipping rate is above the current-peak clipping rate threshold.

10. The method of claim 1, further comprising generating the analog signal based on a digital signal with a digital to analog converter, wherein modifying the amplitude of the analog signal comprises adjusting a level of the digital signal.

11. The method of claim 1, wherein the communication channel comprises a power line communication (PLC) channel.

12. A transmitter comprising:
an analog front end comprising a power amplifier coupled to an output terminal, the output terminal configured to be coupled to a power line communication (PLC) channel;
a digital to analog conversion stage having an input coupled to an input terminal, the digital to analog conversion stage comprising
a digital to analog converter having an input coupled to the input terminal, and
a variable gain amplifier having
an input coupled to an output of the digital to analog converter, and
an output coupled to an input of the analog front end; and
a control module configured to
receive a logic signal from the analog front end,
determine a current-peak clipping rate based on the logic signal,
compare the current-peak clipping rate of the power amplifier with a current-peak clipping rate threshold, and
modify a gain of the variable gain amplifier based on comparing the current-peak clipping rate with the current-peak clipping rate threshold.

13. The transmitter of claim 12, wherein the analog front end is configured to
compare an output current of the power amplifier with a peak current threshold; and
generate the logic signal based on comparing the output current of the power amplifier with the peak current threshold.

14. The transmitter of claim 12, wherein determining the current-peak clipping rate is based on a number of pulses of the logic signal over a time interval.

15. The transmitter of claim 12, wherein modifying the gain of the variable gain amplifier comprises modifying the gain of the variable gain amplifier by a gain step.

16. The transmitter of claim 15, wherein modifying the gain of the variable gain amplifier comprises:
increasing the gain of the variable gain amplifier by the gain step when the current-peak clipping rate is below the current-peak clipping rate threshold; and
decreasing the gain of the variable gain amplifier by the gain step when the current-peak clipping rate is above the current-peak clipping rate threshold.

17. A method for transmitting information over a power line communication (PLC) channel, the method comprising:
generating an analog signal with a variable gain amplifier coupled to a power amplifier;
amplifying the analog signal with the power amplifier to produce an amplified analog signal;
transmitting over the PLC channel frames of information based on the amplified analog signal;
monitoring an output current of the power amplifier;
determining a current-peak clipping rate of the monitored output current;
comparing the current-peak clipping rate with a current-peak clipping rate threshold; and
modifying a gain of the variable gain amplifier based on comparing the current-peak clipping rate with the current-peak clipping rate threshold.

18. The method of claim 17, further comprising:
performing a plurality of successive determinations of the current-peak clipping rate during successive time intervals; and
determining the gain of the variable gain amplifier to be adjusted on a next time interval based on a determination of the current-peak clipping rate during a previous time interval.

19. The method of claim 17, wherein modifying the gain of the variable gain amplifier comprises modifying the gain of the variable gain amplifier by a gain step.

20. The method of claim 19, wherein modifying the gain of the variable gain amplifier comprises:
increasing the gain of the variable gain amplifier by the gain step when the current-peak clipping rate is below the current-peak clipping rate threshold; and
decreasing the gain of the variable gain amplifier by the gain step when the current-peak clipping rate is above the current-peak clipping rate threshold.

* * * * *